(12) United States Patent
Zheng (10) Patent No.: US 8,576,769 B2
(45) Date of Patent: Nov. 5, 2013

(54) SYSTEMS AND METHODS FOR ADAPTIVE INTERFERENCE CANCELLATION BEAMFORMING

(75) Inventor: Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 308 days.

(21) Appl. No.: 12/891,933

(22) Filed: Sep. 28, 2010

(65) Prior Publication Data

US 2011/0075601 A1 Mar. 31, 2011

Related U.S. Application Data (60) Provisional application No. 61/246,313, filed on Sep. 28, 2009.

(51) Int. Cl.
*H04B 7/185* (2006.01)
(52) U.S. Cl.
USPC .......................................................... 370/316
(58) Field of Classification Search
None
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A * | 9/1996 | Dent | 370/319 |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A * | 6/1998 | Bella | 455/13.3 |
| 5,812,947 A | 9/1998 | Dent | |
| 5,832,379 A | 11/1998 | Mallinckrodt | |

(Continued)

FOREIGN PATENT DOCUMENTS

| | | |
|---|---|---|
| EP | 0 506 255 A2 | 9/1992 |
| EP | 0 506 255 A3 | 9/1992 |

(Continued)

OTHER PUBLICATIONS

Ayyagari et al., "A satellite-augmented cellular network concept", *Wireless Networks*, vol. 4, 1998, pp. 189-198.

(Continued)

*Primary Examiner* — Minh-Trang Nguyen
(74) *Attorney, Agent, or Firm* — Myers Bigel Sibley & Sajovec, PA (57) ABSTRACT

Methods of operating a transceiver including an antenna having a plurality of antenna feed elements are disclosed. The methods include receiving a plurality of samples of a receive signal from the plurality of antenna feed elements, estimating locations of a plurality of signal sources from the plurality of receive signal samples, identifying a plurality of interference sources from among the plurality of signal sources, generating a plurality of antenna feed element weights $w_M$ in response to the locations of the interference sources, forming an antenna beam from the antenna to the geographic region using the antenna feed element weights $w_M$, and communicating information over the antenna beam. Related transceivers, satellite gateways and satellites are also disclosed.

22 Claims, 7 Drawing Sheets

(56) References Cited

U.S. PATENT DOCUMENTS

| | | | |
|---|---|---|---|
| 5,835,857 | A | 11/1998 | Otten |
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman et al. |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,062,267 | B2 | 6/2006 | Karabinis |
| 7,092,708 | B2 | 8/2006 | Karabinis |
| 7,113,743 | B2 | 9/2006 | Karabinis |
| 7,113,778 | B2 | 9/2006 | Karabinis |
| 7,149,526 | B2 | 12/2006 | Karabinis et al. |
| 7,155,340 | B2 | 12/2006 | Churan |
| 7,174,127 | B2 | 2/2007 | Otten et al. |
| 7,181,161 | B2 | 2/2007 | Karabinis |
| 7,203,490 | B2 | 4/2007 | Karabinis |
| 7,218,931 | B2 | 5/2007 | Karabinis |
| 7,295,807 | B2 | 11/2007 | Karabinis |
| 7,340,213 | B2 | 3/2008 | Karabinis et al. |
| 7,418,236 | B2 | 8/2008 | Levin et al. |
| 7,418,263 | B2 | 8/2008 | Dutta et al. |
| 7,421,342 | B2 | 9/2008 | Churan |
| 7,437,123 | B2 | 10/2008 | Karabinis et al. |
| 7,444,170 | B2 | 10/2008 | Karabinis |
| 7,447,501 | B2 | 11/2008 | Karabinis |
| 7,453,396 | B2 | 11/2008 | Levin et al. |
| 7,453,920 | B2 | 11/2008 | Churan |
| 7,454,175 | B2 | 11/2008 | Karabinis |
| 7,457,269 | B1 | 11/2008 | Grayson |
| 7,558,568 | B2 | 7/2009 | Karabinis |
| 7,574,206 | B2 | 8/2009 | Karabinis |
| 7,577,400 | B2 | 8/2009 | Karabinis et al. |
| 7,587,171 | B2 | 9/2009 | Evans et al. |
| 7,593,691 | B2 | 9/2009 | Karabinis |
| 7,593,724 | B2 | 9/2009 | Karabinis |
| 7,593,725 | B2 | 9/2009 | Karabinis |
| 7,593,726 | B2 | 9/2009 | Karabinis et al. |
| 7,596,111 | B2 | 9/2009 | Karabinis |
| 7,599,656 | B2 | 10/2009 | Karabinis |
| 7,602,837 | B2 * | 10/2009 | Kotecha et al. ............... 375/148 |
| 7,603,081 | B2 | 10/2009 | Karabinis |
| 7,603,117 | B2 | 10/2009 | Karabinis |
| 7,606,590 | B2 | 10/2009 | Karabinis |
| 7,609,666 | B2 | 10/2009 | Karabinis |
| 7,620,394 | B2 | 11/2009 | Good et al. |
| 7,623,859 | B2 | 11/2009 | Karabinis |
| 7,623,867 | B2 | 11/2009 | Karabinis |
| 7,627,285 | B2 | 12/2009 | Karabinis |
| 7,634,229 | B2 | 12/2009 | Karabinis |
| 7,634,234 | B2 | 12/2009 | Karabinis |
| 7,636,546 | B2 | 12/2009 | Karabinis |
| 7,636,566 | B2 | 12/2009 | Karabinis |
| 7,636,567 | B2 | 12/2009 | Karabinis et al. |
| 7,639,981 | B2 | 12/2009 | Karabinis |
| 7,653,348 | B2 | 1/2010 | Karabinis |
| 7,664,460 | B2 | 2/2010 | Karabinis et al. |
| 7,696,924 | B2 | 4/2010 | Levin et al. |
| 7,706,746 | B2 | 4/2010 | Karabinis et al. |
| 7,706,748 | B2 | 4/2010 | Dutta |
| 7,706,826 | B2 | 4/2010 | Karabinis |
| 7,738,837 | B2 | 6/2010 | Karabinis |
| 7,747,229 | B2 | 6/2010 | Dutta |
| 7,751,823 | B2 | 7/2010 | Karabinis |
| 7,756,490 | B2 | 7/2010 | Karabinis |
| 7,783,287 | B2 | 8/2010 | Karabinis |
| 7,792,069 | B2 | 9/2010 | Karabinis |
| 7,792,488 | B2 | 9/2010 | Karabinis et al. |
| 7,796,985 | B2 | 9/2010 | Karabinis |
| 7,796,986 | B2 | 9/2010 | Karabinis |
| 7,801,520 | B2 | 9/2010 | Karabinis |
| 7,813,700 | B2 | 10/2010 | Zheng et al. |
| 7,817,967 | B2 | 10/2010 | Karabinis et al. |
| 7,831,201 | B2 | 11/2010 | Karabinis |
| 7,831,202 | B2 | 11/2010 | Karabinis |
| 7,831,251 | B2 | 11/2010 | Karabinis et al. |
| 7,856,211 | B2 | 12/2010 | Karabinis |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0149986 | A1 | 8/2003 | Mayfield et al. |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0203393 | A1 | 10/2004 | Chen |
| 2004/0240525 | A1 | 12/2004 | Karabinis et al. |
| 2005/0041619 | A1 | 2/2005 | Karabinis et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0181786 | A1 | 8/2005 | Karabinis et al. |
| 2005/0201449 | A1 | 9/2005 | Churan |
| 2005/0227618 | A1 | 10/2005 | Karabinis et al. |
| 2005/0239399 | A1 | 10/2005 | Karabinis |
| 2005/0260947 | A1 | 11/2005 | Karabinis et al. |
| 2005/0260984 | A1 | 11/2005 | Karabinis |
| 2005/0272369 | A1 | 12/2005 | Karabinis et al. |
| 2006/0040613 | A1 | 2/2006 | Karabinis et al. |
| 2006/0094420 | A1 | 5/2006 | Karabinis |
| 2006/0135058 | A1 | 6/2006 | Karabinis |
| 2006/0135070 | A1 | 6/2006 | Karabinis |
| 2006/0165120 | A1 | 7/2006 | Karabinis |
| 2006/0194576 | A1 | 8/2006 | Karabinis et al. |
| 2006/0205347 | A1 | 9/2006 | Karabinis |
| 2006/0205367 | A1 | 9/2006 | Karabinis |

(56) References Cited

U.S. PATENT DOCUMENTS

| | | |
|---|---|---|
| 2006/0211452 A1 | 9/2006 | Karabinis |
| 2006/0246838 A1 | 11/2006 | Karabinis |
| 2006/0252368 A1 | 11/2006 | Karabinis |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0117903 A1 | 5/2010 | Zheng |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |
| WO | WO 2007/001996 A1 | 1/2007 |

OTHER PUBLICATIONS

Bo, Wu: "Realization and Simulation of DOA estimation using MUSIC Algorithm with Uniform Circular Arrays", CEEM'2006/Dalian, 4A5-08, Beijing Univ. of Posts & Telecom., Beijing, 100876, China; pp. 908-912.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

International Search Report and Written Opinion corresponding to International Application No. PCT/US2010/050475; Date of Mailing: Feb. 18, 2011; 17 pages.

Written Opinion of the International Preliminary Examining Authority Corresponding to International Application No. PCT/US2010/050475; Date of Mailing: Sep. 28, 2011; 7 pages.

* cited by examiner

SYSTEMS AND METHODS FOR ADAPTIVE INTERFERENCE CANCELLATION BEAMFORMING

CROSS REFERENCE TO RELATED APPLICATION

This application claims the benefit of and priority to U.S. Provisional Patent Application No. 61/246,313; filed Sep. 28, 2009, entitled "SYSTEMS AND METHODS FOR ADAPTIVE INTERFERENCE CANCELLATION BEAMFORMING FOR SATELLITE BEAM," the disclosure of which is hereby incorporated herein by reference as if set forth in its entirety.

FIELD OF THE INVENTION

This invention relates to wireless communications systems and methods, and more particularly to antenna systems and methods for terrestrial and/or satellite wireless communications systems.

BACKGROUND

Beam forming refers to a technique of shaping an antenna gain pattern to improve communications using the antenna. In particular, beam forming refers to techniques for selecting complex weight coefficients ("weights") for antenna feed elements in a multi-element antenna. Signals to be transmitted from the antenna elements are multiplied by respective weights prior to transmission. Signals received by the antenna elements are multiplied by respective weights before being combined for processing.

Beam forming techniques have been applied to many modern mobile satellite systems (MSS). With multiple transmitting and receiving antenna feed elements, a satellite beam former forms a plurality of service area spot-beams (or cells) in both the forward link and/or the reverse link by using advanced antenna array signal processing. Beam forming can increase the average signal to noise and/or signal to interference ratio by focusing energy into desired directions in the forward link and/or the reverse link. By estimating the response to each antenna element to a given user or a given location, and possible interference signals, a satellite/gateway can combine the elements with weights obtained as a function of each element response to improve the average desired signal and reduce other components, whether noise, interference or both. The spot-beams may be, for example, either fixed to an area or adaptive to particular users and/or interference environments depending, for example, on application scenarios and/or design considerations.

SUMMARY

Methods of operating a transceiver including an antenna having a plurality of antenna feed elements are disclosed. In some embodiments, the methods include receiving a plurality of samples of a receive signal from the plurality of antenna feed elements, estimating locations of a plurality of signal sources from the plurality of receive signal samples, identifying a plurality of interference sources from among the plurality of signal sources, generating a plurality of antenna feed element weights $w_M$ in response to the locations of the interference sources, forming an antenna beam from the antenna to the geographic region using the antenna feed element weights $w_M$, and communicating information over the antenna beam.

The methods may further include defining a plurality of antenna gain constraint values $g_k$ associated with a plurality of geographic constraint points within a geographic region, and determining interference weighting factors for the geographic constraint points and locations of the interference sources. The antenna feed element weights are generated in response to the interference weighting factors.

Generating the antenna feed element weights $w_M$ includes generating antenna feed element weights $w_M$ that result in antenna response values $f_K$ at the geographic constraint points based on the corresponding antenna gain constraint values $g_K$ and the interference weighting factors at the interference source locations.

The methods may further include estimating power levels of the interference sources, the interference weighting factors are determined in response to the power levels of the interference sources.

Estimating locations of the plurality of signal sources may further include estimating an array covariance matrix for the plurality of antenna feed elements in response to the plurality of samples of the receive signal to form an array covariance matrix estimate, generating a spatial spectrum from the array covariance matrix estimate, and estimating the directions of arrival from the largest peaks of the spatial spectrum.

Generating the spatial spectrum from the array covariance matrix may include performing an eigen-decomposition of the array covariance matrix estimate, identifying signal eigenvectors and noise eigenvectors for the covariance matrix estimate, and generating the spatial spectrum in response to the noise eigenvectors and feed array steering data for the antenna array.

The methods may further include designating signal sources that fall within a predetermined zero-gain zone as interference sources.

Estimating locations of the plurality of signal sources may further include estimating an array covariance matrix for the plurality of antenna feed elements in response to the plurality of samples of the receive signal to form an array covariance matrix estimate according to the following equation:

$$\hat{R} = \frac{1}{N}\sum_{t=1}^{N} y(t)y^H(t) = \hat{E}_s\hat{\Lambda}_s\hat{E}_s^H + \hat{E}_n\hat{\Lambda}_n\hat{E}_n^H$$

where:

$\hat{R}$ is the estimated array covariance matrix,

N is the number of samples of the receive signal, y(t) is the receive signal vector sampled at time t, $\hat{E}_s$ is a matrix of K eigenvectors corresponding to the K largest eigenvalues of the array covariance matrix, $\hat{E}_n$ is a matrix of M-K eigenvectors corresponding to the M-K smallest eigenvalues of the array covariance matrix, where M is equal to the number of feed elements in the antenna array, $\hat{\Lambda}_s$ is a matrix of the K largest eigenvalues of the array covariance matrix, and $\hat{\Lambda}_n$ is a matrix of the M-K smallest eigenvalues of the array covariance matrix.

Estimating locations of the plurality of signal sources may further include generating the spatial spectrum from the array covariance matrix estimate according to the following equation:

$$Pss(\theta, \varphi) = \frac{a^H(\theta, \varphi)a(\theta, \varphi)}{a^H(\theta, \varphi)\hat{E}_n\hat{E}_n^H a(\theta, \varphi)},$$

wherein a(θ, φ) is the array steering matrix, and
estimating the directions of arrival from the largest peaks of the spatial spectrum.

The methods may include defining a threshold $\lambda_T$ and defining eigenvalues of the array covariance matrix R greater than $\lambda_T$ as corresponding to signal space and eigenvalues of the array covariance matrix R less than $\lambda_T$ as defining noise subspace, so that the number of eigenvalues of the array covariance matrix R greater than $\lambda_T$ is equal to the number K of signal sources.

The methods may further include estimating power levels of the interference sources, the interference weighting factors are determined according to the following equation:

$$[\alpha_1, \alpha_2 \ldots \alpha_L] = \frac{\beta}{p_{min}}[p_1, p_2 \ldots p_L], \beta > 1$$

where:
$\alpha_1$ to $\alpha_L$ are the interference source weighting factors,
$p_1$ to $p_L$, are the power estimates for the interference sources, and
β is a predefined constant.

A transceiver according to some embodiments includes an antenna having a plurality of antenna feed elements, and an electronics system including a beam former. The beam former is configured to receive a plurality of samples of a receive signal from the plurality of antenna feed elements, estimate locations of a plurality of signal sources from the plurality of receive signal samples, identify a plurality of interference sources from among the plurality of signal sources, and generate a plurality of antenna feed element weights $w_M$ in response to the locations of the interference sources. The beam former is configured to form an antenna beam from the antenna to the geographic region using the antenna feed element weights $w_M$, and the electronics system is configured to communicate information over the antenna beam.

The beam former may be further configured to define a plurality of antenna gain constraint values $g_k$ associated with a plurality of geographic constraint points within a geographic region, determine interference weighting factors for the geographic constraint points and locations of the interference sources, and generate the antenna feed element weights in response to the interference weighting factors.

The beam former may be further configured to generate the antenna feed element weights $w_M$ that result in antenna response values $f_K$ at the geographic constraint points based on the corresponding antenna gain constraint values $g_K$ (and the interference weighting factors at the interference source locations.

The beam former may be further configured to estimate power levels of the interference sources, and determine the interference weighting factors in response to the power levels of the interference sources.

The beam former may be further configured to: estimate an array covariance matrix for the plurality of antenna feed elements in response to the plurality of samples of the receive signal to form an array covariance matrix estimate, generate a spatial spectrum from the array covariance matrix estimate, and estimate the directions of arrival from the largest peaks of the spatial spectrum.

The beam former may be further configured to perform an eigen-decomposition of the array covariance matrix estimate, identify signal eigenvectors and noise eigenvectors for the covariance matrix estimate, and generate the spatial spectrum in response to the noise eigenvectors and feed array steering data for the antenna array.

The beam former may be further configured to designate signal sources that fall within a predetermined zero-gain zone as interference sources.

The beam former may be further configured to estimate an array covariance matrix for the plurality of antenna feed elements in response to the plurality of samples of the receive signal to form an array covariance matrix estimate according to the following equation:

$$\hat{R} = \frac{1}{N}\sum_{t=1}^{N} y(t)y^H(t) = \hat{E}_s\hat{\Lambda}_s\hat{E}_s^H + \hat{E}_n\hat{\Lambda}_n\hat{E}_n^H$$

where:
$\hat{R}$ is the estimated array covariance matrix,
N is the number of samples of the receive signal,
y(t) is the receive signal vector,
$\hat{E}_s$ is a matrix of K eigenvectors corresponding to the K largest eigenvalues of the array covariance matrix,
$\hat{E}_n$ is a matrix of M-K eigenvectors corresponding to the M-K smallest eigenvalues of the array covariance matrix, where M is equal to the number of feed elements in the antenna array,
$\hat{\Lambda}_s$ is a matrix of the K largest eigenvalues of the array covariance matrix, and
$\hat{\Lambda}_n$ is a matrix of the M-K smallest eigenvalues of the array covariance matrix.

The beam former may be further configured to generate the spatial spectrum from the array covariance matrix estimate according to the following equation:

$$Pss(\theta, \varphi) = \frac{a^H(\theta, \varphi)a(\theta, \varphi)}{a^H(\theta, \varphi)\hat{E}_n\hat{E}_n^H a(\theta, \varphi)},$$

where a(θ, φ) is the array steering matrix, and estimate the directions of arrival from the largest peaks of the spatial spectrum.

The beam former may be further configured to define a threshold $\lambda_T$, and define eigenvalues of the array covariance matrix R greater than $\lambda_T$ as corresponding to signal space and eigenvalues of the array covariance matrix R less than $\lambda_T$ as defining noise subspace, so that the number of eigenvalues of the array covariance matrix R greater than $\lambda_T$ is equal to the number K of signal sources.

The beam former may be further configured to estimate power levels of the interference sources. The interference weighting factors may be determined according to the following equation:

$$[\alpha_1, \alpha_2 \ldots \alpha_L] = \frac{\beta}{p_{min}}[p_1, p_2, \ldots p_L], \beta > 1$$

where:

α₁ to α_L are the interference source weighting factors, p₁ to p_L, are the power estimates for the interference sources, and β is a predefined constant.

A communications satellite according to some embodiments includes an antenna having a plurality of antenna feed elements, and an electronics system including a beam former. The beam former is configured to receive a plurality of samples of a receive signal from the plurality of antenna feed elements, estimate locations of a plurality of signal sources from the plurality of receive signal samples, identify a plurality of interference sources from among the plurality of signal sources, and generate a plurality of antenna feed element weights $w_M$ in response to the locations of the interference sources. The beam former is configured to form an antenna beam from the antenna to the geographic region using the antenna feed element weights $w_M$, and the electronics system is configured to communicate information over the antenna beam.

A satellite gateway according to some embodiments includes an electronics system including a beam former. The beam former is configured to receive a plurality of samples of a receive signal from the plurality of antenna feed elements, estimate locations of a plurality of signal sources from the plurality of receive signal samples, identify a plurality of interference sources from among the plurality of signal sources, and generate a plurality of antenna feed element weights $w_M$ in response to the locations of the interference sources. The beam former is configured to form an antenna beam from the antenna to the geographic region using the antenna feed element weights $w_M$, and the electronics system is configured to communicate information over the antenna beam.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Adaptive Interference Cancellation (AIC) beamforming is typically only applied to small satellite spot-beams. For large regional satellite beams, conventional AIC beamforming systems/methods, such as Linearly Constrained Minimum Variance (LCMV), may not perform well, because defining a large beam may require many more constraint points than defining a smaller spot-beam. Using more constraint points consumes more degrees of freedom and may leave no or little room for generating effective interference nulling outside the beam. Beamforming systems and/or methods according to some embodiments perform adaptive interference cancellation that may be used for both small and large satellite beams. AIC beamforming systems/methods according to some embodiments may estimate the locations and strengths of active interference sources, and may adaptively generate nulling toward the interference locations while maintaining the beam shape close to all other constraint points according to the nonlinear least squares (NLS) criterion.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Beam forming techniques have been applied to many communications systems, including mobile satellite systems (MSS). With multiple transmitting and receiving antenna feed elements, a satellite beam former may form a plurality of service area spot-beams (or cells) in the forward link and/or the reverse link by using advanced antenna array signal processing. A goal of beam forming is to increase the average signal to noise and/or signal to interference ratio of a link by focusing energy into desired directions in either the forward link or the reverse link. By estimating the response to each antenna element to a given user or a given location, and possible interference signals, a satellite/gateway can combine the elements with weights obtained as a function of each element response to improve the average desired signal and/or to reduce other components, such as noise, interference or both. The spot-beams may be, for example, either fixed to an area or adaptive to particular users and/or interference environments depending, for example, on application scenarios and/or design considerations.

Figure 1A:
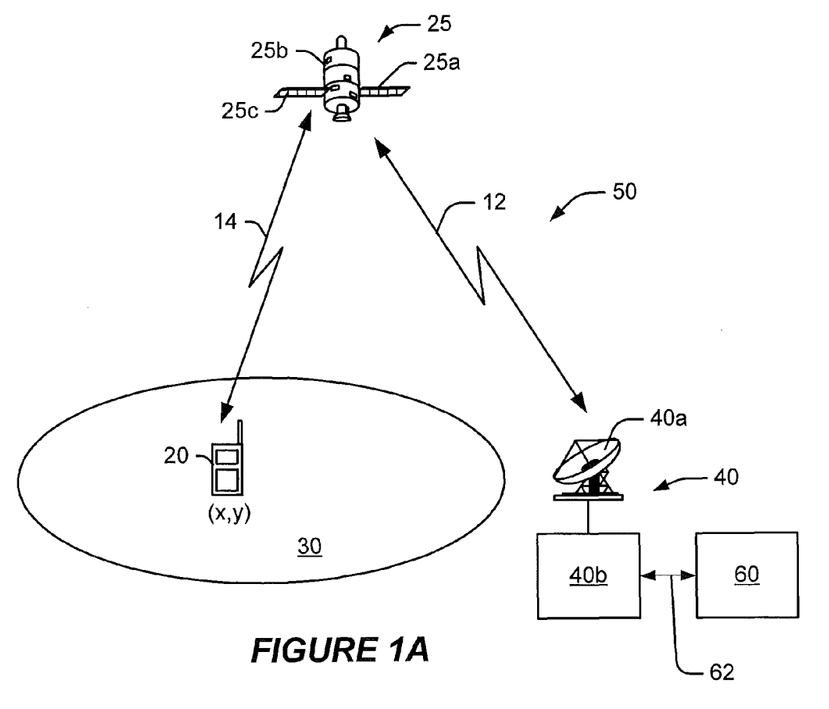
FIG. 1A illustrates exemplary communications systems/methods according to some embodiments.

A system 50 according to some embodiments is illustrated in FIG. 1A. Although embodiments are described herein in connection with satellite radio communications systems, it will be appreciated that the present invention can be embodied in other types of wireless communications systems, including terrestrial wireless communications systems, fixed and/or mobile wireless communications systems, hybrid satellite/terrestrial communications systems, etc.

Referring to FIG. 1A, a radioterminal 20 is located in a geographic cell, or service area, 30 based on the geographic (x,y) coordinates of the radioterminal 20. The geographic coordinates of the radioterminal 20 may be determined, for example, by a GPS processor (not shown) within the radioterminal 20. The radioterminal 20 is also located within the geographic footprint of a satellite transceiver 25, which may be a low-earth orbiting satellite (LEO), a medium-earth orbiting satellite (MEO), and/or a geostationary satellite (GEO). The satellite transceiver 25, which includes an antenna 25a and an electronics system 25b, communicates with at least one satellite gateway 40, which includes an antenna 40a and an electronics system 40b via a feeder link 12. The satellite antenna 25a may include an array of antenna feed elements 25c, which generate signals covering respective overlapping geographic areas in the geographic footprint of the satellite transceiver 25.

The satellite 25 may communicate with the radioterminal 20 by forming a transmit and/or receive beam toward the satellite service area 30 by appropriately weighting signals transmitted by the antenna feed elements 25c using complex antenna feed element weights. That is, by multiplying the transmitted or received signal by different complex antenna feed element weights for each of the antenna feed elements 25c and simultaneously transmitting/receiving the signal from the antenna feed elements 25c, the signals transmitted/received by the antenna feed elements 25c may combine to produce a desired signal pattern within/from the satellite service area 30.

It will be further appreciated that in some embodiments, the beamforming function may be performed in the electronics system 25b of the satellite 25, in the electronics system 40b of the satellite gateway 40, and/or in a separate beam former 60 that provides the antenna feed element weights to the gateway 40 for transmission to the satellite transceiver 25. For example, the beam former 60 may include a processor configured to generate antenna feed element weights and to provide the antenna feed element weights to the satellite gateway 40 via a communications link 62. Whether implemented in the satellite transceiver 25, the gateway 40 or as a separate beam former 60, the beam former may include a programmed general purpose or special purpose computer or other logic circuit that is configured to generate antenna feed element weights as described below.

Figure 1B:
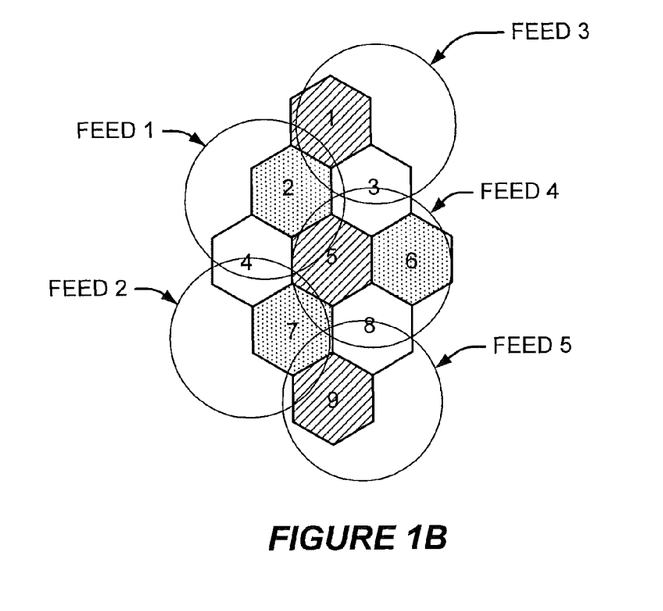
FIG. 1B schematically illustrates an exemplary footprint of five satellite forward link feed elements that are superimposed over a virtual cell configuration.

FIG. 1B schematically illustrates an exemplary footprint of five satellite forward link feed elements that are superimposed over a virtual cell configuration, assuming a frequency reuse ratio of three, for a satellite transmit beamforming system. In FIG. 1B, the idealized footprints of five antenna feed elements are transposed over nine virtual cells defined by their actual physical locations within the satellite footprint. Cells 1, 5 and 9 use a first frequency or set of frequencies, while cells 3, 4 and 8 use a second frequency or set of frequencies and cells 2, 6, and 7 use a third frequency or set of frequencies.

Figure 2:
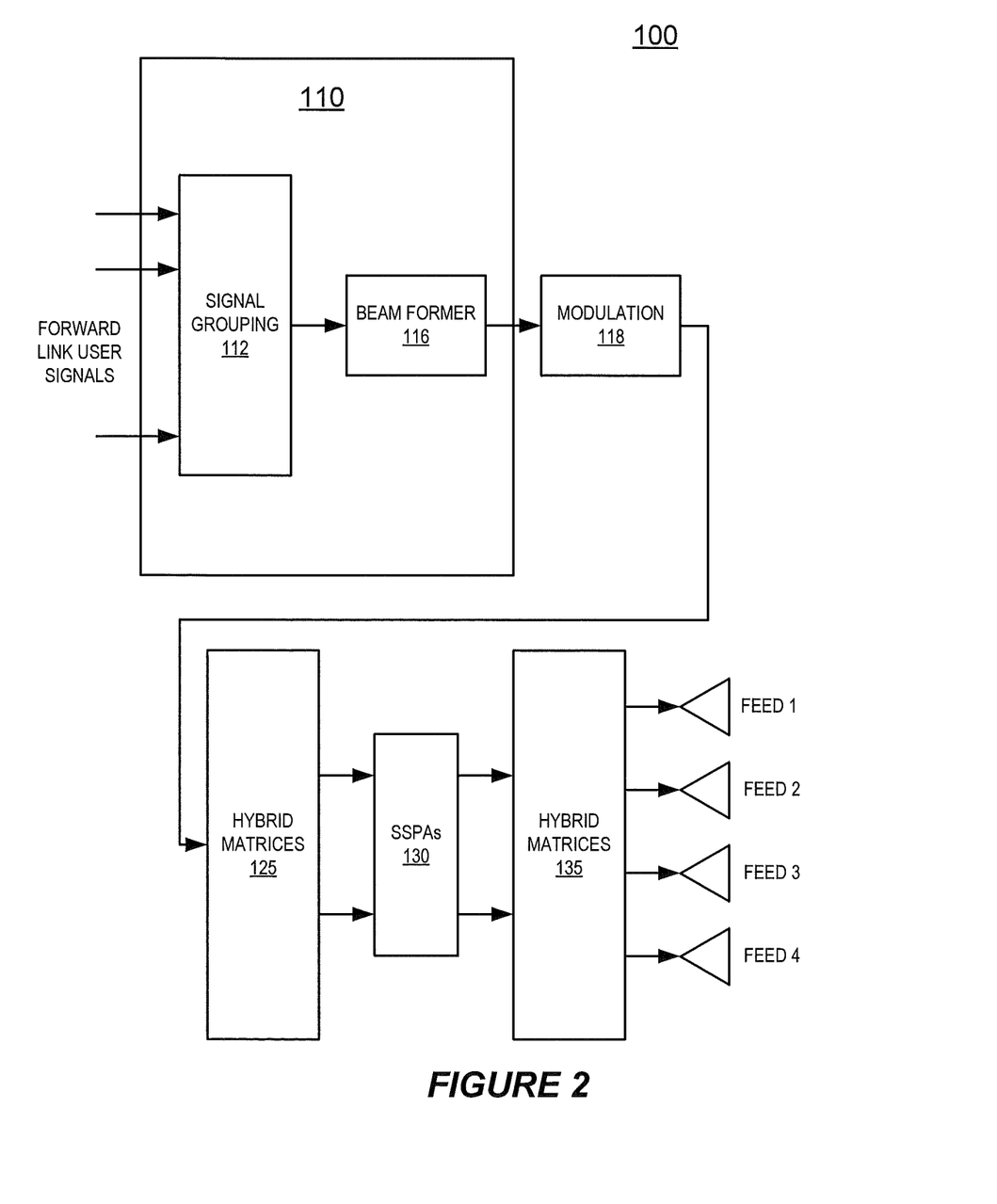
FIG. 2 illustrates a transmitter including a multiple feed antenna according to some embodiments.

A block diagram that illustrates beamforming systems and/or methods for a forward link transmitter 100 according to some embodiments of the invention is shown in FIG. 2. The transmitter 100 may be implemented, for example, in a satellite and/or in a satellite gateway. When the transmitter 100 is implemented in a satellite gateway, the satellite gateway may generate complex antenna weights and transmit the complex antenna weights to a satellite for use in forming a beam from the satellite to a geographic service area 30. Alternatively, a beam former can be located outside the satellite gateway and can generate antenna weights that can be transmitted to the satellite/satellite gateway.

The transmitter 100 includes a controller 110 that is configured to perform certain data processing operations on data signals that are to be transmitted by the transmitter 100. For example, the controller 110 may be configured to perform encoding, interleaving, grouping, and/or other operations. In the transmitter 100, forward link user signals are grouped into N frequency bands and are associated with subgroups of feed elements (block 112). Although four feed elements Feed 1 to Feed 4 are illustrated in FIG. 2, it will be appreciated that more or fewer feed elements could be employed.

Beams are formed by beam formers 116. In beamforming, complex weights are generated for each of the feed elements. Signals transmitted by the feed elements are multiplied by the respective complex weights, resulting in a desired signal gain pattern within the footprint, or geographic service region, of the antenna. Although illustrated as a single element in FIG. 2, the beam former 116 could include a block/module that generates the complex antenna feed element weights and a separate block/module that applies the complex antenna feed element weights to the transmitted and/or received signals.

The formed beams are modulated by RF modulation (block 118) and amplified by solid state power amplifiers (SSPAs) 130, and then transmitted by each feed element Feed 1 to Feed M in parallel. In order to equalize the signal input levels applied to the individual transmit amplifiers, and therefore maintain the amplifiers within their proper signal level range, hybrid matrix amplifier configurations are commonly used onboard communication satellites. A typical hybrid matrix amplifier is comprised of a set of N ($N=2^n$, where n is an integer) parallel amplifiers located symmetrically between two, cascaded N-input by N-output multi-port hybrid matrix devices. In a typical hybrid matrix amplifier arrangement, N individual amplifier input signals are supplied by the N outputs of the N×N Input multi-port hybrid matrix 125, and the N SSPAs 130 output signals are similarly applied to the input section of the N×N Output multi-port hybrid matrix 135.

It will be appreciated that the beam formers 116 may form beams in a fixed manner or in an adaptive, closed loop manner, in which measured antenna gain values are fed back to the beam former and used to dynamically adjust the complex antenna feed element weights.

As noted above, traditional AIC beamforming systems/methods, such as LCMV, may not perform well for large satellite beam because defining a large beam may require more constraint points than defining a smaller spot-beam, which consumes more degrees of freedom and may leave no or little room for generating effective interference nulling outside the beam. Furthermore, the LCMV algorithm requires all constraint points to be defined in not only gain specifications but also phase specifications. Phase information is known to be important to the beam performance, but is difficult to specify.

Some beam forming systems/methods for large beams based on the nonlinear least square (NLS) criterion have been developed. For example, NLS-based beamforming systems/methods are described in U.S. application Ser. No. 12/603,911, filed Oct. 22, 2009, entitled "Iterative Antenna Beam Forming Systems/Methods," the disclosure of which is hereby incorporated herein by reference as if set forth in its entirety. These algorithms either do not require phase specification for the constraint points or provide a way to find optimal phase specifications, but all lead to an NLS solution for the beam forming weights. However, the algorithms may typically only be used for fixed beamforming because all the constraint points (including nulling points) subject to NLS have to be pre-defined in terms of locations and gains and/or phases.

The fixed beam forming design assumes the interference sources are known in terms of locations and strengths. Fixed beam forming attempts to derive an optimal beam that reduces/minimizes interference and increases/maximizes in-beam gain based on the known interference information. In other words, the fixed beam is optimized against a particular interference scenario. However, in some situations, the interference conditions may be time-variant, so that the fixed beam may not continue to be optimal over the time. In this situation, it may be desirable for the beam weights to be adaptively adjusted to the time-variant interference conditions.

To enable AIC beamforming for large beams, it may be desirable for the beam former to be able to estimate the interference locations and strengths accurately over time. By using these important interference estimates, the beamformer may be able to find a weight solution that leads to adaptive interference cancellation. Beam forming systems/methods according to some embodiments address two important challenges. The first is how to estimate the interferences from the received feed array vector data, and the second is how to use these interference estimates with an optimal beamforming criterion, such as NLS, to obtain an AIC beamforming solution. AIC beamforming systems and/or methods according to some embodiments are described below.

Active Source Localization and Parameter Estimation

Figure 3:
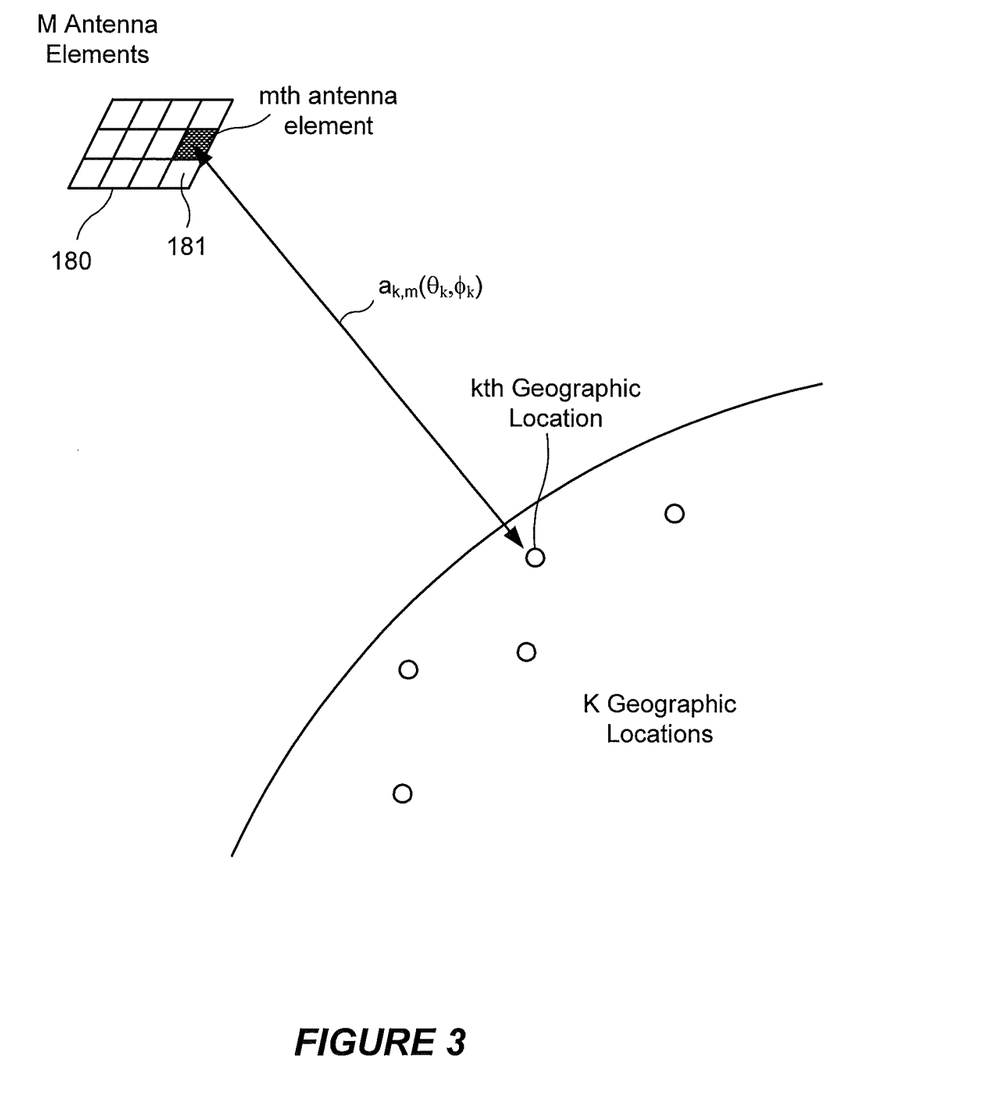
FIG. 3 illustrates parameters of a system including an M-element antenna array configured to generate a beam that is constrained at K geographic locations.

Referring to FIG. 3, a 2-D antenna array 180 with M antenna feed elements 181 is provided. The $m^{th}$ feed element has the complex response $a_{k,m}(\theta_k, \phi_k)$ at elevation angle $\theta_k$ and azimuth angle $\phi_k$ for the $k^{th}$ location point. The array steering vector at the $k^{th}$ location is therefore defined by $$a_k(\theta_k,\phi_k)=[a_{k,1}(\theta_k,\phi_k), \ldots a_{k,M}(\theta_k,\phi_k)]^T \in C^{M \times 1} \quad (1)$$

Assume there are K active source locations, the received signal plus noise gives the outputs of the feed array vector in the form of $$y(t)=A(\theta,\phi)s(t)+n(t) \quad (2)$$

where A is a matrix of K steering vectors:

$$A(\theta,\phi)=[a_1(\theta_1,\phi_1), \ldots a_K(\theta_K,\phi_K)] \in C^{M \times K}, \quad (3)$$

s(t) is a vector of source signals at the K source locations:

$$s(t)=[s_1(t),s_2(t),\ldots,s_k(t)]^T$$

and $n(t) \in C^{M \times 1}$ is the noise vector of noise signals received at the M feed elements. The feed array outputs are appropriately sampled at t=1, 2, ..., N time instances and these snapshots y(1), y(2), ..., y(N) can be view as a multichannel Gaussian random process. The characteristics of a Gaussian process can be well understood from its first and second order statistics determined by the underlying signals as well as noise. The problem of interest for active source location and estimation is to estimate the direction-of-arrivals (DOAs), waveform and/or power of emitter signals impinging on a receiving array when a set of sample data {y(1), y(2), ..., y(N)} is given.

When the interference consists of spatially white noise, the array covariance matrix has the form $$R=E\{y(t)y^H(t)\}=AR_s A^H + \sigma^2 I \in C^{M \times M} \quad (4)$$

where $R_s=E\{s(t)s^H(t)\}$ is the source covariance matrix.

The eigen-decomposition of R results in the representation $$R = \sum_{i=1}^{M} \lambda_i e_i e_i^H = E_s \Lambda_s E_s^H + E_n \Lambda_n E_n^H \quad (5)$$

where $\lambda_1 > \ldots > \lambda_K > \lambda_{K+1} = \ldots = \lambda_M = \sigma^2$. The matrix $E_s = [e_1, \ldots, e_K]$ contains the K eigenvectors corresponding to the K largest eigenvalues. The range space of $E_s$ is called the signal subspace. Its orthogonal complement is the noise subspace, which is spanned by the columns of $E_n = [e_{K+1}, \ldots, e_M]$.

The eigen-decomposition of the sample covariance matrix of the y vector is given by $$\hat{R} = \frac{1}{N}\sum_{t=1}^{N} y(t) y^H(t) = \hat{E}_s \hat{\Lambda}_s \hat{E}_s^H + \hat{E}_n \hat{\Lambda}_n \hat{E}_n^H. \quad (6)$$

The number of sources, K, which is also the rank of $AR_s A^H$, can be determined from the eigenvalues of R. In practice, the few smallest eigenvalues for the noise subspace may occur in a cluster rather than precisely equal. However, the eigenvalues (and/or K) for the signal subspace may be well determined by setting up a threshold, $\lambda_T$ which would separate the M eigenvalues into K eigenvalues for signal subspace and the rest M-K for noise subspace, that is $$\lambda_1 > \ldots > \lambda_K \geq \lambda_T > \lambda_{K+1} \geq \ldots \geq \lambda_M \quad (7)$$

It is known that the noise eigenvectors in $E_n$ are orthogonal to A, i.e., $$E_n^H a_k(\theta_k, \phi_k) = 0, k = 1, \ldots, K \quad (8)$$

Therefore, in practice, we may form a "spatial spectrum" $Pss(\theta, \phi)$ from the noise eigenvectors and the feed array steering data as below $$Pss(\theta, \varphi) = \frac{a^H(\theta, \varphi) a(\theta, \varphi)}{a^H(\theta, \varphi) \hat{E}_n \hat{E}_n^H a(\theta, \varphi)} \quad (9)$$

The direction of arrival (DOA) estimates $\{(\hat{\theta}_1, \hat{\phi}_1), (\hat{\theta}_2, \hat{\phi}_2), \ldots (\hat{\theta}_K, \hat{\phi}_K)\}$ are determined by the locations of the largest K peaks of the "spatial spectrum" provided $\hat{E}_n \hat{E}_n^H$ is close to $E_n E_n^H$.

Once the DOA estimates are available, the A matrix can be constructed, and the other parameters can be estimated as well. One such important parameter is the power for each of the incident sources $[p_1, p_2, \ldots, p_K]$, which is defined by the diagonal of $R_s$. From (4), we have $AR_s A^H = R - \sigma^2 I$, thus $$\hat{R}_s = (\hat{A}^H \hat{A})^{-1} \hat{A} (\hat{R} - \hat{\sigma}^2 I) \hat{A} (\hat{A}^H \hat{A})^{-1} \quad (10)$$

$$[p_1, p_2, \ldots, p_K] = \text{diag}(\hat{R}_s) \quad (11)$$

where $\hat{\sigma}^2$ is the estimate of the noise variance, which may be obtained by the mean of the noise eigenvalues, which is $$\hat{\sigma}^2 = \text{mean}\{\text{diag}(\hat{\Lambda}_n)\} = \frac{\lambda_{K+1} + \ldots + \lambda_M}{M - K} \quad (12)$$

Adaptive Interference Nulling Beamforming with Interference Source Information

According to some embodiments, a beam optimization algorithm based on the NLS criterion can be applied to adaptive interference nulling given that all of the active source locations and strengths are known. Initially, the interference sources are distinguished from the desired sources among the active source estimates. Since the footprint of the beam and its exclusion zone are known, the interference sources and the signal sources can be identified respectively based on the knowledge of the locations for all active sources. Those estimates $\{(\hat{\theta}_1, \hat{\phi}_1), (\hat{\theta}_2, \hat{\phi}_2), \ldots (\hat{\theta}_K, \hat{\phi}_K)\}$ that fall in the main beam footprint are the signal sources. Those estimates $\{(\hat{\theta}_1, \hat{\phi}_1), (\hat{\theta}_2, \hat{\phi}_2), \ldots (\hat{\theta}_K, \hat{\phi}_K)\}$ that are within the so called "zero-gain zone" (beyond the exclusive zone) defined by Z_Zone, will be regarded as the interference sources. These interference sources are the points of interest for the beamformer to form "nulling" according to the strength of each interference source. Assume that there are L interference sources among the active estimated sources, i.e., $$\{(\hat{\theta}_1, \hat{\phi}_1), \ldots (\hat{\theta}_L, \hat{\phi}_L)\} = \{(\hat{\theta}_1, \hat{\phi}_1), (\hat{\theta}_2, \hat{\phi}_2), \ldots (\hat{\theta}_K, \hat{\phi}_K)\} \cap Z\_zone, L \leq K \quad (13)$$

and the corresponding power estimates are given by $[p_1, \ldots, p_L]$, then these interference source locations can be treated as additional "nulling" points in "zero-gain zone" where the extent of nulling may be adapted proportionally to the corresponding power estimate level by properly scaling the non-negative weighting factor for these "nulling" points. In beamforming based on the NLS criterion, it is assumed that there are N points for the zero constraints (including the L interference source location points) and P points for the non-zero constraints, where N+P=Q. The object of beamforming based on NLS is to find a weight vector w that reduces/minimizes the following cost function:

$$\xi = \sum_{q=1}^{Q} \alpha_q [|f_q(w, \theta_q, \varphi_q)| - g_q(\theta_q, \varphi_q)]^2 \quad (14)$$

$$= \sum_{n=1}^{N} [\alpha_n f_n(w, \theta_n, \varphi_n) f_n^H(w, \theta_n, \varphi_n)] +$$

$$\sum_{p=1}^{P} \alpha_p \left[ \sqrt{f_p(w, \theta_p, \varphi_p) f_p^H(w, \theta_p, \varphi_p)} - g_p \right]^2$$

$$= F_N(w, \theta, \varphi) \alpha_N F_N^H(w, \theta, \varphi) + F_P(w, \theta, \varphi) \alpha_P F_P^H(w, \theta, \varphi) -$$

$$2 \sum_{p=1}^{P} \left[ \alpha_p g_p \sqrt{f_p(w, \theta_p, \varphi_p) f_p^H(w, \theta_p, \varphi_p)} \right] +$$

$$\sum_{p=1}^{P} (\alpha_p g_p^2)$$

where $f_q(w, \theta_q, \phi_q) = w^H a_q(\theta_q, \phi_q)$, $F_Q(w, \theta, \phi) = [f_1(w, \theta_1, \phi_1), \ldots, f_Q(w, \theta_Q, \phi_Q)] = w^H A_Q(\theta, \phi)$, $\quad (15)$ $g_q(\theta_q, \phi_q)$ defines the desired the beam gain at the $q^{th}$ location, and $$\alpha_N = \text{diag}\{\alpha_1, \alpha_2 \ldots \alpha_N\} \in R^{N \times N} \quad (16)$$

$$\alpha_P = \text{diag}\{\alpha_1, \alpha_2 \ldots \alpha_P\} \in R^{P \times P} \quad (17)$$

are the user-defined real non-negative weighting factors to provide the ability to emphasize or de-emphasize individual constraint points based on their relative geographic importance. Among the N points in "zero-gain zone" there are L points that correspond to the L interference source locations. In order to generate sufficient nulls at these L locations, it may be desirable to emphasize these zero constraint points by scaling the corresponding weighting factors appropriately according to the power estimates $[p_1, \ldots, p_L]$.

By defining $$p_{min} = \min\{p_1, \ldots, p_L\}, \quad (18)$$

the interference weighting factors may take the following form $$[\alpha_1, \alpha_2 \ldots \alpha_L] = \frac{\beta}{p_{min}}[p_1, p_2, \ldots p_L], \beta > 1 \quad (19)$$

where $\beta$ is user defined constant that is greater than one.

The weighting factors for the "zero-gain zone" may be rewritten as $$\alpha_N = \text{diag}\{\alpha_1, \alpha_2 \ldots \alpha_L, \alpha_{L+1}, \ldots \alpha_N\} \in R^{N \times N} \quad (20)$$

For example, one may choose, $\beta=2$, and $\alpha_n \leq 1$ for $n=L+1, \ldots, N$.

Having defined all the parameters, the gradient search method that reduces/minimizes the cost function in (14) may be readily used to find the beamforming weight vector. The gradient is given by $$\nabla(\xi) = \frac{\partial \xi}{\partial w}$$
$$= \left[\frac{\partial \xi}{\partial w_1} \frac{\partial \xi}{\partial w_2} \cdots \frac{\partial \xi}{\partial w_M}\right]^T$$
$$= 2R_N w + 2R_P w - 2\sum_{p=1}^{P}\left[\alpha_p(w^H a_p a_p^H w)^{\frac{1}{2}} g_p(a_p a_p^H)w\right]$$
$$= 2(R_N + R_P)w - 2\sum_{p=1}^{P}\frac{R_p w \alpha_p g_p}{\sqrt{w^H R_p w}} \quad (\phantom{0})$$

where $$R_N = A_N \alpha_N A_N^H \quad (22)$$

$$R_P = A_P \alpha_P A_P^H \quad (23)$$

$$R_p = a_p a_p^H \quad (24)$$

A practical iterative approach may be expressed by $$w^{i+1} = w^i + \mu(-\nabla^i) \quad (25)$$

where $\mu$ is a constant step size, and i is an iteration number. The weights are adjusted in the direction of the gradient at each step until convergence occurs, for example when the gradient reaches or becomes close to zero, or is less than a threshold gradient.

Systems and/or methods for adaptive interference cancellation beamforming according to some embodiments may be applied to a wide range of beam designs, including large regional beams, with AIC capability. Systems and/or methods may operate according to following algorithms and procedures:

1. Obtain N samples of the feed array vector data, as in Equation (2)
2. Estimate the feed array covariance matrix according to Equation (6)
3. Perform eigen-decomposition of the covariance matrix estimate
4. Obtain signal subspace and noise subspace estimates, and estimated K according to Equation (7)
5. Form a "spatial spectrum" by using the noise eigenvectors and the feed array steering data, as in Equation (9)
6. Estimate the DOAs from the largest K peaks of the "spatial spectrum"
7. Estimate the powers of the K active sources according to Equation (11)
8. Determine the interference sources from the K active sources that are fall in the "zero-gain zone" according to Equation (13)
9. Determine the interference weighting factors, as in Equation (19)
10. Form the complete "zero-gain zone" weighting factors, as in Equation (20)
11. Perform the iterative procedures according to Equations (2125).

Figure 4:
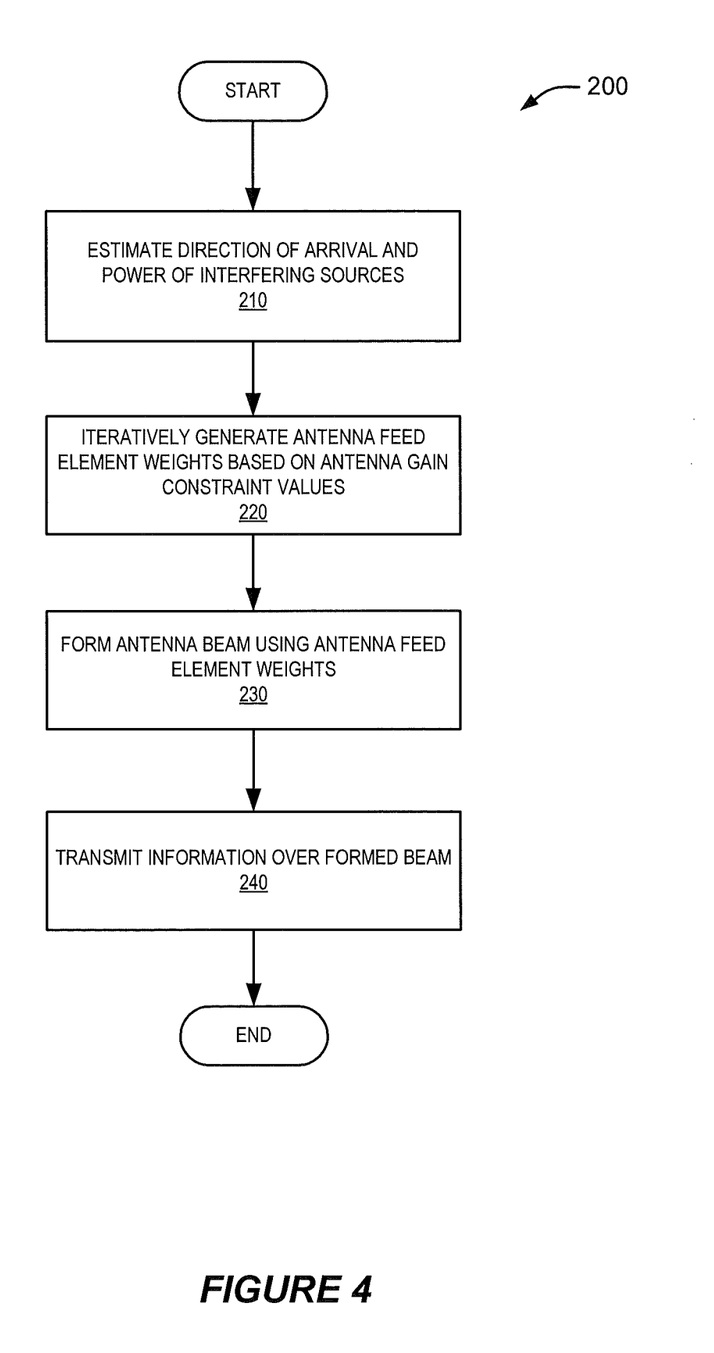
FIGS. 4 and 5 are flowcharts illustrating systems and/or methods according to some embodiments.
Figure 5:
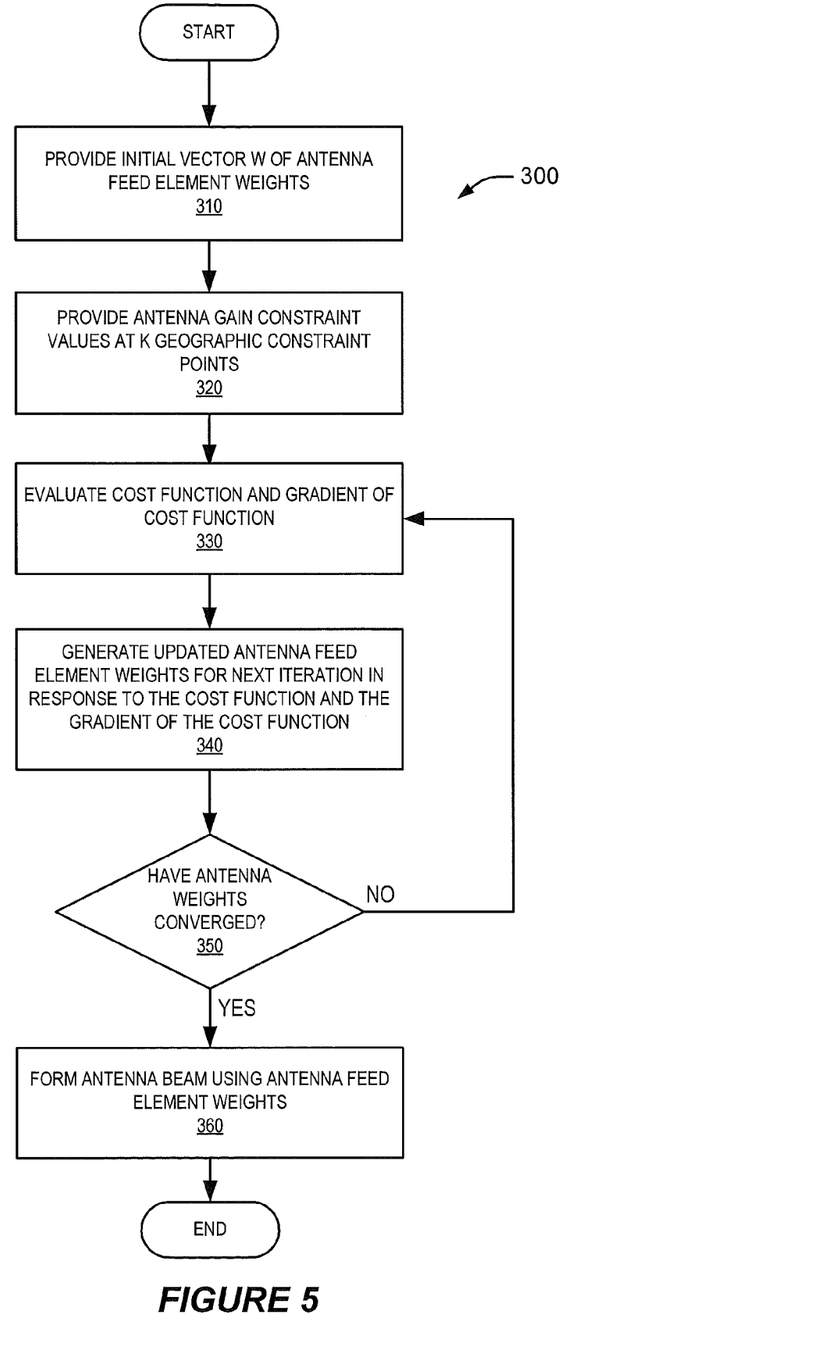

Systems/methods according to some embodiments are illustrated in FIGS. 4 and 5. Referring to FIG. 4, in systems/methods according to some embodiments the direction of arrival and power of K interfering sources is estimated (Block 210). Antenna feed element weights for the antenna array elements are then iteratively generated in response to the antenna gain constraint values, including gain constraint values defined in response to the locations/powers of the K interfering sources (Block 220). An antenna beam is then formed using the antenna feed element weights (Block 230), and information is transmitted over the beam (Block 240).

FIG. 5 is a flowchart illustrating operations 300 according to some embodiments of the invention. As shown therein, operations 300 according to some embodiments include providing an initial set of complex valued antenna feed element weights, for example, as the conjugate of a beam center steering vector (Block 310), and providing a plurality of antenna gain constraint values $g_k$ at K geographic constraint points (Block 320).

A cost function, such as the cost function defined in equation (14), and the gradient of the cost function (equation (21)) are evaluated (Block 330), and updated antenna feed element weights are generated in response to the cost function and the gradient of the cost function (Block 340).

At Block 350, a determination is made as to whether the antenna weight vector has converged, for example, by comparing the value of the cost function at the updated antenna feed element weights to one or more previously calculated values of the cost function. If the antenna weight vector has not converged, a new set of weights is generated (Block 340), and the loop is continued.

Once the antenna weights have converged, an antenna beam is formed using the converged antenna feed element weights (Block 360).

Unlike many traditional AIC algorithms, which only can be used for return link beamforming for a small spot beam, the disclosed systems and methods may be applied not only for AIC beamforming for a large satellite beam, but also for a small spot-beam as well. Moreover, with the active interference source estimates, the AIC systems and/or methods described herein can be used for both return link and forward link AIC beamforming.

Simulations

The performance of AIC beamforming according to some embodiments was evaluated using computer simulations. The simulations implemented the complete algorithms and procedures as described above with feed element data provided by satellite manufacturer Boeing (80 feeds). For the interference source localization, the simulation assumes: 1) the noise temperature of feed T=26.5 dBK; 2) there are 4 independent interference sources with PSD of 20 dBW/10 MHz for each; and 3) N=1000 samples of feed array vector data are used for the feed array covariance matrix estimation.

Figure 6:
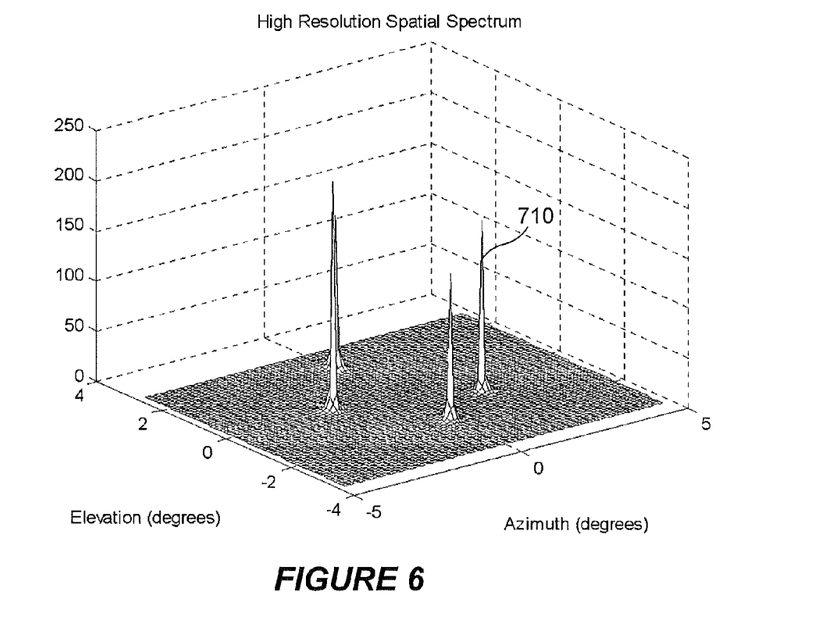
FIG. 6 illustrates a spatial spectrum showing the locations of four simulated interference sources obtained according to some embodiments.

FIG. 6 shows the "spatial spectrum" formed using systems/methods according to some embodiments, which clearly indicates four spikes that correspond to the four interfering sources.

Figure 7:
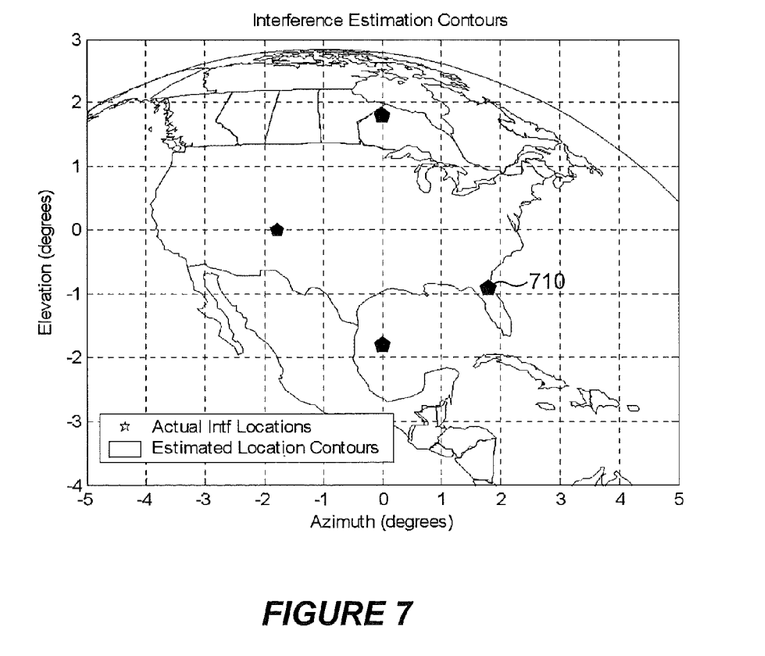
FIG. 7 is a plot of the simulated interference locations on a map of the continental United States.

FIG. 7 plots the actual interference locations and the estimated interference location contours from the "spatial spectrum", which shows that the estimated locations are right on top of the actual interference locations. The estimated interference information was then applied to the AIC beamforming optimization.

Figure 8:
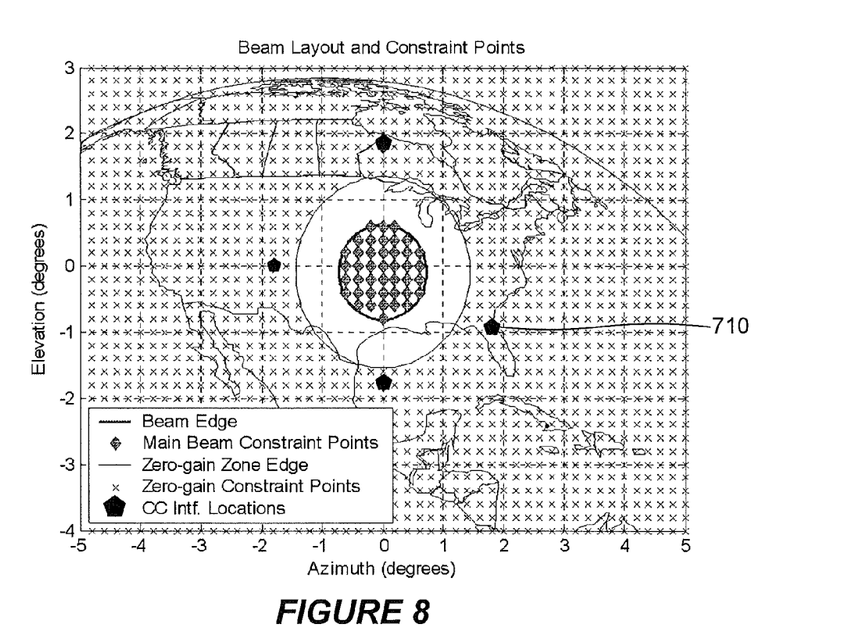
FIG. 8 illustrates exemplary gain constraint points used for simulating beamforming methods according to some embodiments.

FIG. 8 illustrates the beam layout and constraint points by incorporating all information for the optimal beamforming based on NLS.

Figure 9:
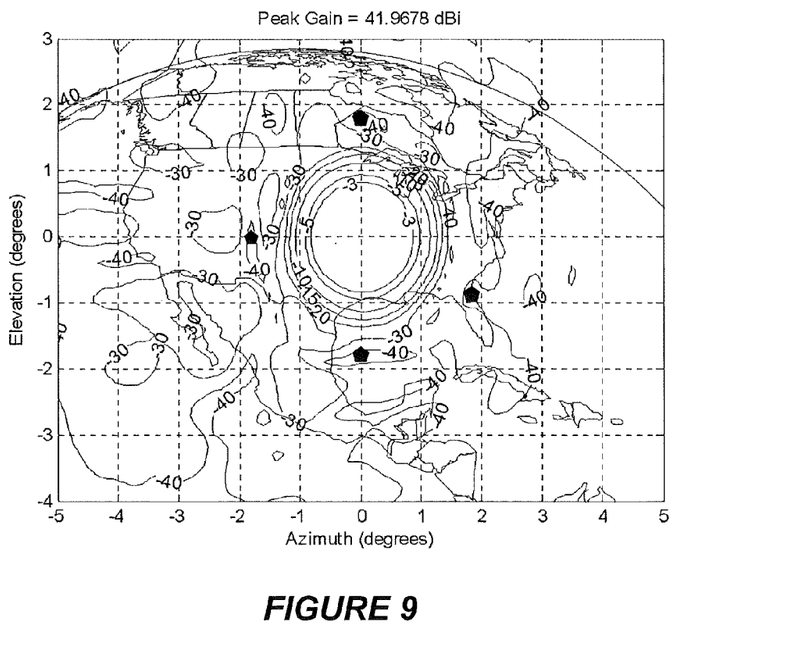
FIG. 9 illustrates beam gain contours (in dB) simulated using an iterative method according to some embodiments.

Finally, the result of the AIC beamforming according to embodiments of the present invention is given in FIG. 9. The beam contour maintains well-behaved coverage for the main beam area while generating the desired nulling toward the actual interferers.

AIC beamforming systems and/or methods according to embodiments of the present invention may estimate the locations and strengths of active interference sources, and adaptively generate nulling toward the interference locations while maintaining the beam shape close to all other constraint points according to the nonlinear least square (NLS) criterion. Furthermore, with the estimates of active interference sources, the AIC beamforming systems/methods described above not only can be applied for the return link beamforming, but also for the forward link beamforming as well.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of operating a transceiver including an antenna having a plurality of antenna feed elements, the method comprising:
   receiving a plurality of samples of a receive signal from the plurality of antenna feed elements;
   estimating locations of a plurality of signal sources from the plurality of receive signal samples;
   identifying a plurality of interference sources from among the plurality of signal sources;
   generating a plurality of antenna feed element weights $w_M$ in response to locations of the interference sources, wherein generating the plurality of antenna feed element weights comprises defining a plurality of antenna gain constraint values gk associated with a plurality of geographic constraint points within a geographic region and determining interference weighting factors for the geographic constraint points and locations of the interference sources, wherein the antenna feed element weights are generated in response to the interference weighting factors;
   forming an antenna beam from the antenna to the geographic region using the antenna feed element weights $w_M$; and
   communicating information over the antenna beam.

2. The method of claim 1, wherein generating the antenna feed element weights $w_M$ comprises generating antenna feed element weights $w_M$ that result in antenna response values $f_K$ at the geographic constraint points based on the corresponding antenna gain constraint values $g_K$ and the interference weighting factors at the interference source locations.

3. The method of claim 1, further comprising estimating power levels of the interference sources, wherein the interference weighting factors are determined in response to the power levels of the interference sources.

4. The method of claim 3, further comprising estimating power levels of the interference sources, wherein the interference weighting factors are determined according to the following equation:

$$[\alpha_1, \alpha_2 \ldots \alpha_L] = \frac{\beta}{p_{min}}[p_1, p_2, \ldots p_L] \quad \beta > 1$$

where:
$\alpha_1$ to $\alpha_L$ are the interference source weighting factors;
$p_1$ to $p_L$ are the power estimates for the interference sources; and
$\beta$ is a predefined constant.

5. The method of claim 1, wherein estimating locations of the plurality of signal sources comprises:
   estimating an array covariance matrix for the plurality of antenna feed elements in response to the plurality of samples of the receive signal to form an array covariance matrix estimate according to the following equation:

$$\hat{R} = \frac{1}{N}\sum_{t=1}^{N} y(t)y^H(t) = \hat{E}_s\hat{\Lambda}_s\hat{E}_s^H + \hat{E}_n\hat{\Lambda}_n\hat{E}_n^H$$

where:
$\hat{R}$ is the estimated array covariance matrix,
N is the number of samples of the receive signal,
y(t) is the receive signal vector;
$\hat{E}_s$ is a matrix of K eigenvectors corresponding to the K largest eigenvalues of the array covariance matrix;
$\hat{E}_n$ is a matrix of M-K eigenvectors corresponding to the M-K smallest eigenvalues of the array covariance matrix, where M is equal to the number of feed elements in the antenna array;
$\hat{\Lambda}_s$ is a matrix of the K largest eigenvalues of the array covariance matrix; and
$\hat{\Lambda}_n$ is a matrix of the M-K smallest eigenvalues of the array covariance matrix.

6. The method of claim 5, wherein estimating locations of the plurality of signal sources further comprises:
   generating the spatial spectrum from the array covariance matrix estimate according to the following equation:

$$Pss(\theta, \varphi) = \frac{a^H(\theta, \varphi)a(\theta, \varphi)}{a^H(\theta, \varphi)\hat{E}_n\hat{E}_n^H a(\theta, \varphi)}$$

wherein $a(\theta, \phi)$ is the array steering matrix; and
estimating directions of arrival of signals from the plurality of signal sources from largest peaks of the spatial spectrum.

7. The method of claim 6, further comprising defining a threshold $\lfloor_T$ and defining eigenvalues of the array covariance matrix R greater than $\lfloor_T$ as corresponding to signal space and eigenvalues of the array covariance matrix R less than $\lfloor_T$ as defining noise subspace, so that the number of eigenvalues of the array covariance matrix R greater than $\lfloor_T$ is equal to the number K of signal sources.

8. A method of operating a transceiver including an antenna having a plurality of antenna feed elements, the method comprising:
    receiving a plurality of samples of a receive signal from the plurality of antenna feed elements;
    estimating locations of a plurality of signal sources from the plurality of receive signal samples;
    identifying a plurality of interference sources from among the plurality of signal sources;
    generating a plurality of antenna feed element weights $w_M$ in response to locations of the interference sources;
    forming an antenna beam from the antenna to the geographic region using the antenna feed element weights $w_M$; and
    communicating information over the antenna beam;
    wherein estimating locations of the plurality of signal sources comprises:
    estimating an array covariance matrix for the plurality of antenna feed elements in response to the plurality of samples of the receive signal to form an array covariance matrix estimate;
    generating a spatial spectrum from the array covariance matrix estimate; and
    estimating directions of arrival of signals from the signal sources from largest peaks of the spatial spectrum.

9. The method of claim 8, wherein generating the spatial spectrum from the array covariance matrix comprises:
    performing an eigen-decomposition of the array covariance matrix estimate;
    identifying signal eigenvectors and noise eigenvectors for the covariance matrix estimate; and
    generating the spatial spectrum in response to the noise eigenvectors and feed array steering data for the antenna array.

10. The method of claim 8, further comprising:
    designating signal sources that fall within a predetermined zero-gain zone as interference sources.

11. A transceiver, comprising:
    an antenna having a plurality of antenna feed elements; and
    an electronics system including a beam former configured to:
    receive a plurality of samples of a receive signal from the plurality of antenna feed elements;
    estimate locations of a plurality of signal sources from the plurality of receive signal samples;
    identify a plurality of interference sources from among the plurality of signal sources;
    generate a plurality of antenna feed element weights $w_M$ in response to locations of the interference sources; and
    form an antenna beam from the antenna to the geographic region using the antenna feed element weights $w_M$;
    wherein the electronics system is configured to communicate information over the antenna beam; and
    wherein the beam former is further configured to:
    define a plurality of antenna gain constraint values $g_k$ associated with a plurality of geographic constraint points within a geographic region;
    determine interference weighting factors for the geographic constraint points and locations of the interference sources; and
    generate the antenna feed element weights in response to the interference weighting factors.

12. The method of claim 11, wherein the beam former is further configured to:
    generate the antenna feed element weights $w_M$ that result in antenna response values $f_K$ at the geographic constraint points based on the corresponding antenna gain constraint values $g_K$ and the interference weighting factors at the interference source locations.

13. The transceiver of claim 11, wherein the beam former is further configured to:
    estimate power levels of the interference sources; and
    determine the interference weighting factors in response to the power levels of the interference sources.

14. The transceiver of claim 13, wherein the beam former is further configured to:
    estimate power levels of the interference sources, wherein the interference weighting factors are determined according to the following equation:

$$[\alpha_1, \alpha_2 \ldots \alpha_L] = \frac{\beta}{p_{min}}[p_1, p_2, \ldots p_L] \; \beta > 1$$

where:
$\alpha_1$ to $\alpha_L$ are the interference source weighting factors;
$p_1$ to $p_L$ are the power estimates for the interference sources; and
$\beta$ is a predefined constant.

15. A transceiver, comprising:
    an antenna having a plurality of antenna feed elements; and
    an electronics system including a beam former configured to:
    receive a plurality of samples of a receive signal from the plurality of antenna feed elements;
    estimate locations of a plurality of signal sources from the plurality of receive signal samples;
    identify a plurality of interference sources from among the plurality of signal sources;
    generate a plurality of antenna feed element weights $w_M$ in response to locations of the interference sources; and
    form an antenna beam from the antenna to the geographic region using the antenna feed element weights $w_M$;
    wherein the electronics system is configured to communicate information over the antenna beam; and
    wherein the beam former is further configured to:
    estimate an array covariance matrix for the plurality of antenna feed elements in response to the plurality of samples of the receive signal to form an array covariance matrix estimate;
    generate a spatial spectrum from the array covariance matrix estimate; and
    estimate directions of arrival of signals from the plurality of signal sources from largest peaks of the spatial spectrum.

16. The transceiver of claim 15, wherein the beam former is further configured to:
    perform an eigen-decomposition of the array covariance matrix estimate;
    identify signal eigenvectors and noise eigenvectors for the covariance matrix estimate; and
    generate the spatial spectrum in response to the noise eigenvectors and feed array steering data for the antenna array.

17. The transceiver of claim 15, wherein the beam former is further configured to designate signal sources that fall within a predetermined zero-gain zone as interference sources.

18. The transceiver of claim 15, wherein the beam former is further configured to:

estimate an array covariance matrix for the plurality of antenna feed elements in response to the plurality of samples of the receive signal to form an array covariance matrix estimate according to the following equation:

$$\hat{R} = \frac{1}{N}\sum_{t=1}^{N} y(t)y^H(t) = \hat{E}_s\hat{\Lambda}_s\hat{E}_s^H + \hat{E}_n\hat{\Lambda}_n\hat{E}_n^H$$

where:

$\hat{R}$ is the estimated array covariance matrix,

N is the number of samples of the receive signal, y(t) is the receive signal vector;

$\hat{E}_s$ is a matrix of K eigenvectors corresponding to the K largest eigenvalues of the array covariance matrix;

$\hat{E}_n$ is a matrix of M-K eigenvectors corresponding to the M-K smallest eigenvalues of the array covariance matrix, where M is equal to the number of feed elements in the antenna array;

$\hat{\Lambda}_s$ is a matrix of the K largest eigenvalues of the array covariance matrix; and $\hat{\Lambda}_n$ is a matrix of the M-K smallest eigenvalues of the array covariance matrix.

19. The transceiver of claim 18, wherein the beam former is further configured to:

generate the spatial spectrum from the array covariance matrix estimate according to the following equation:

$$Pss(\theta, \varphi) = \frac{a^H(\theta, \varphi)a(\theta, \varphi)}{a^H(\theta, \varphi)\hat{E}_n\hat{E}_n^H a(\theta, \varphi)}$$

wherein a(θ, φ) is the array steering matrix; and estimate directions of arrival of signals from the plurality of signal sources from largest peaks of the spatial spectrum.

20. The transceiver of claim 19, wherein the beam former is further configured to:

define a threshold $\lfloor_T$; and define eigenvalues of the array covariance matrix R greater than $\lfloor_T$ as corresponding to signal space and eigenvalues of the array covariance matrix R less than $\lfloor_T$ as defining noise subspace, so that the number of eigenvalues of the array covariance matrix R greater than $\lfloor_T$ is equal to the number K of signal sources.

21. A communications satellite, comprising:

an antenna having a plurality of antenna feed elements; and an electronics system including a beam former configured to:

receive a plurality of samples of a receive signal from the plurality of antenna feed elements;

estimate locations of a plurality of signal sources from the plurality of receive signal samples;

identify a plurality of interference sources from among the plurality of signal sources;

generate a plurality of antenna feed element weights $w_M$ in response to locations of the interference sources; and form an antenna beam from the antenna to the geographic region using the antenna feed element weights $w_M$;

wherein the electronics system is configured to communicate information over the antenna beam, and wherein the beam former is further configured to:

define a plurality of antenna gain constraint values $g_k$ associated with a plurality of geographic constraint points within a geographic region;

determine interference weighting factors for the geographic constraint points and locations of the interference sources; and generate the antenna feed element weights in response to the interference weighting factors.

22. A satellite gateway, comprising:

an antenna; and an electronics system coupled to the antenna and including a beam former configured to:

receive a plurality of samples of a receive signal from a plurality of satellite antenna feed elements;

estimate locations of a plurality of signal sources from the plurality of receive signal samples;

identify a plurality of interference sources from among the plurality of signal sources;

generate a plurality of satellite antenna feed element weights $w_M$ in response to locations of the interference sources; and form an antenna beam from a satellite antenna to a geographic region using the antenna feed element weights $w_M$;

wherein the electronics system is configured to communicate information over the antenna beam; and wherein the beam former is further configured to:

define a plurality of antenna gain constraint values $g_k$ associated with a plurality of geographic constraint points within a geographic region;

determine interference weighting factors for the geographic constraint points and locations of the interference sources; and generate the antenna feed element weights in response to the interference weighting factors.

* * * * *